Jan. 14, 1936.  P. R. GIRAUD  2,027,475
APPARATUS FOR THE PURIFICATION OF WATER
Filed Aug. 25, 1934  4 Sheets-Sheet 1

INVENTOR
P. R. Giraud
By Watson, Coit, Morse & Grindle
ATTYS

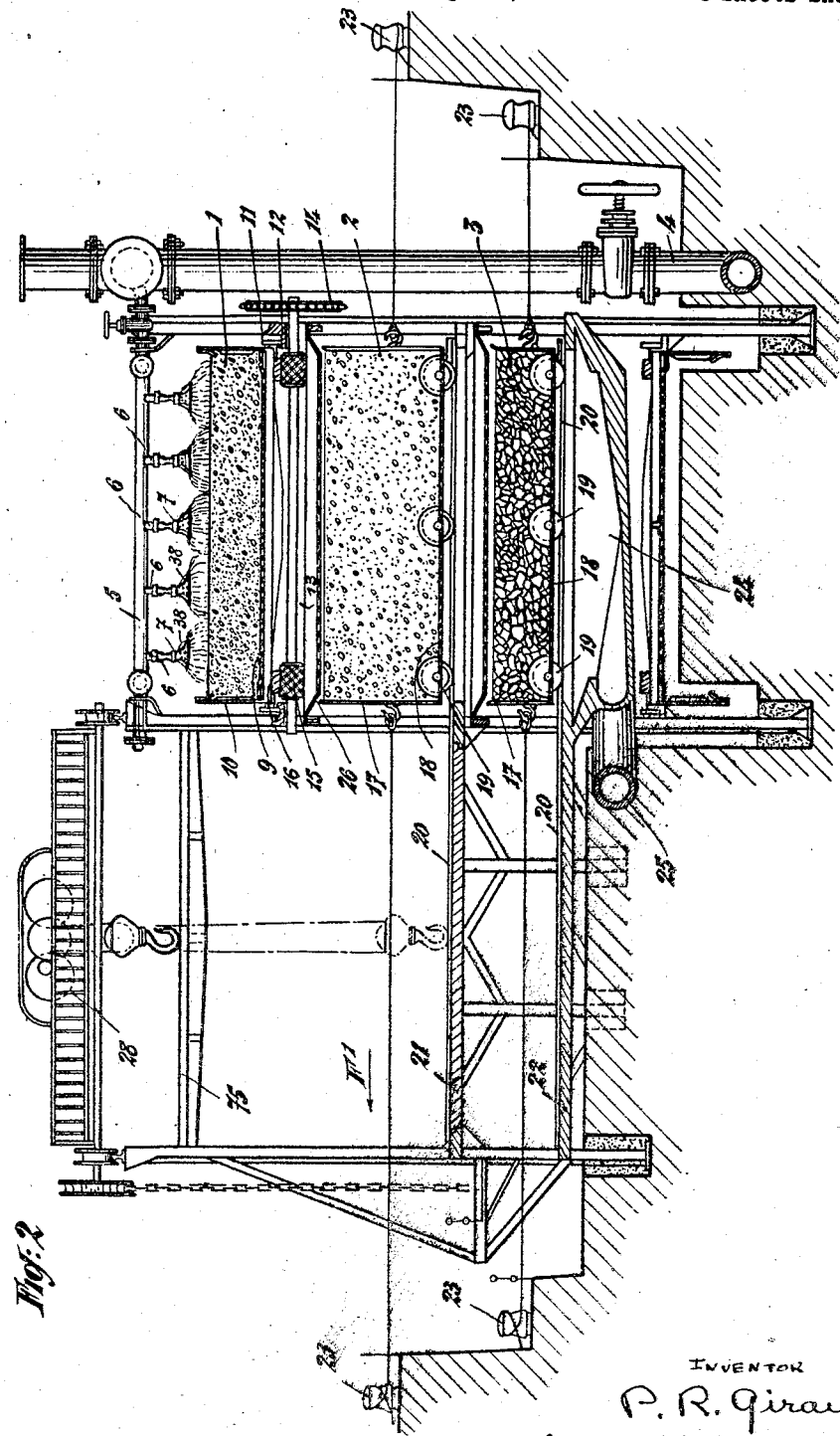

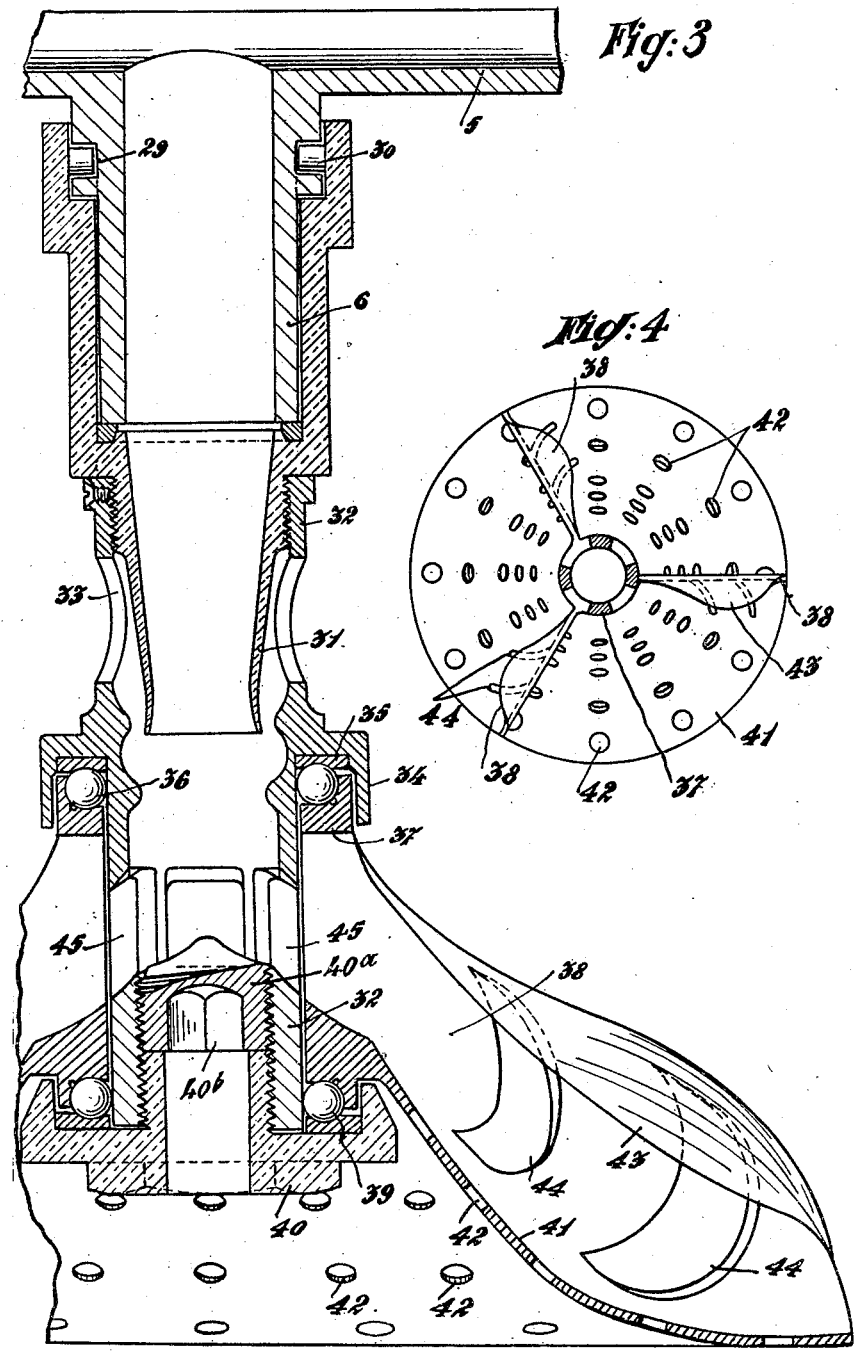

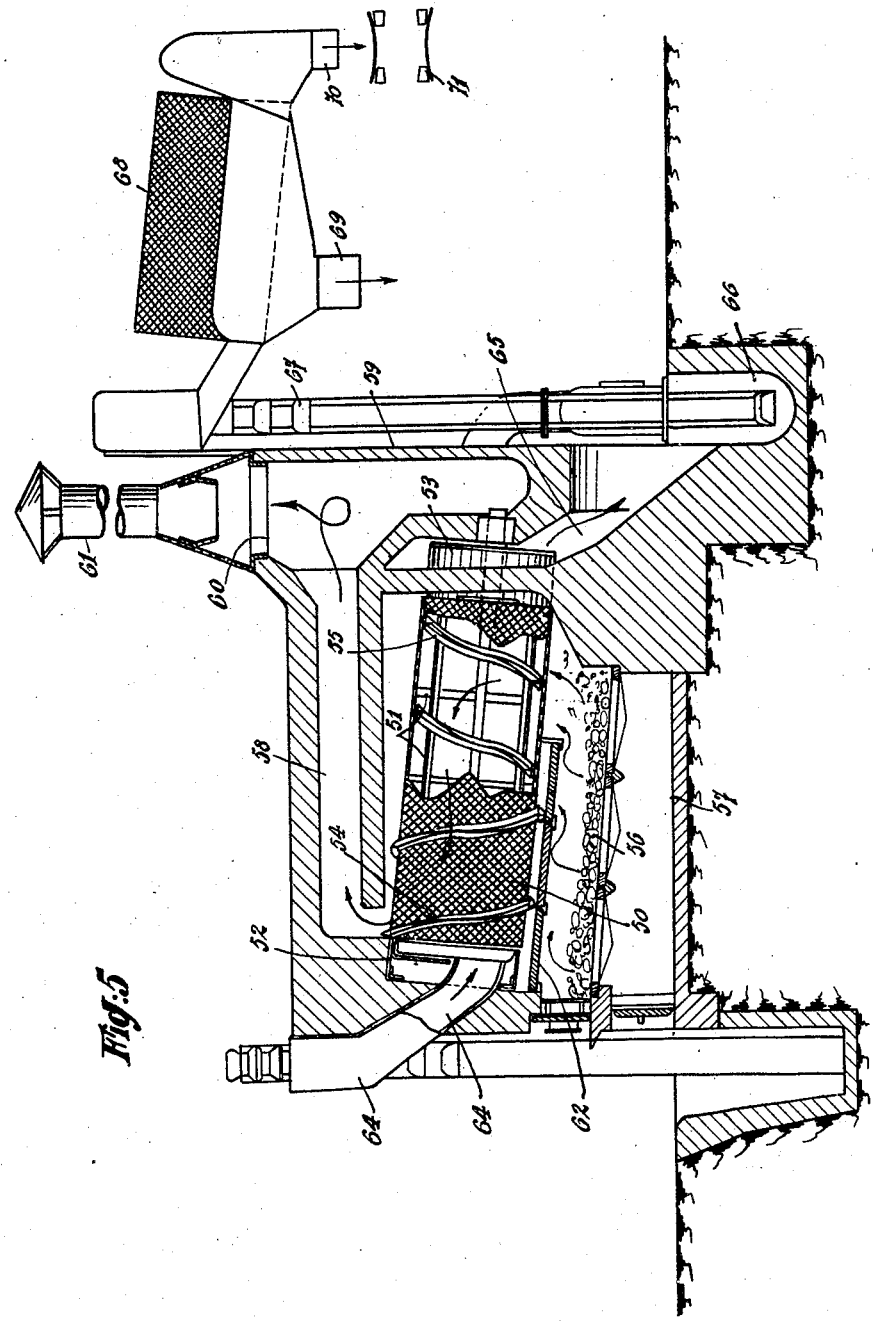

Patented Jan. 14, 1936

2,027,475

UNITED STATES PATENT OFFICE 2,027,475

APPARATUS FOR THE PURIFICATION OF WATER

Pierre René Giraud, Paris, France, assignor to Société d'Etude pour l'Epuration des Eaux "Procédés G. et B.", Paris, France, a company of France Application August 25, 1934, Serial No. 741,500
In France September 2, 1933

4 Claims. (Cl. 210—196)

It is known that, in order to obtain desirable results in the purification of water, it is advantageous to perform this purification in two steps, to wit:

1. A mechanical purification of water producing by filtration a preliminary clarification;
2. A biological or bacterial purification obtained by oxydation of water.

The object of the present invention is to provide an apparatus for performing, without occupying too much space, the first step above mentioned, that is to say the mechanical purification, and also the constant and continuous unclogging of the filtering matters, with a drying of the recovered residues of these matters.

Another object of the invention is to obtain a beginning of nitrification which will stop the putrescent fermentation so that, in some cases of relatively small pollution, the water treated can be directly poured back into a river after passing through the filtering beds.

For this purpose, according to the present invention, the water to be treated is distributed, after having been atomized and in the state of liquid sheets, over a filtering bed which is given a continuous translatory motion, said water then passing successively through a second and a third filtering bed and being finally collected and conveyed to the place where it is to be used. The matters that form the first and second beds are clogged and charged with impurities after this treatment, they are therefore suitably dried and regenerated and can thus serve for an unlimited period of time.

According to an embodiment of the present invention, the first filtering bed, or upper bed, consists of a layer of clinker or an analogous material, carried by a series of elements having a perforated bottom, suitably jointed to one another so as to form a chain conveyor which can be driven at a very slow speed. The clinker or other suitable filtering material is fed at one end into these elements and withdrawn therefrom at the other end. This conveyor therefore successively brings under the water inlet elements charged with new or regenerated material which, after having been used, is conveyed to a drying cylinder. The latter is provided with perforated walls and is given a rotary movement. Hot gases coming from a furnace into which the mud having passed through the perforated walls of the cylinder is directly poured are caused to flow through said cylinder. When issuing from the drying cylinder, the regenerated matters and the dried mud that has been driven therewith are poured into a hole where they are caught by a conveyor and conveyed to a sorting cylinder which eliminates, together with the mud that has been driven along, the parts of the filtering matter that are of too small a size. The remainder of the filtering matter is brought to a place where it is fed back into the elements of the first mentioned conveyor.

The apparatus or plant according to the present invention therefore includes a group of devices for clarifying water which comprises the chain conveyor and the filtering tanks, and a group of devices for drying and regenerating the filtering material.

A preferred embodiment of the present invention will be hereinafter described, with reference to the accompanying drawings, given merely by way of example, and in which:

Fig. 2 is a sectional view on the line 2—2 of Fig. 1, on an enlarged scale;

Fig. 3 is a detail view on an enlarged scale of a device for distributing the water to be treated in the apparatus;

Fig. 4 is a plan view, on a reduced scale, of the apparatus of Fig. 3;

Fig. 5 is a longitudinal sectional view of a drying device according to the present invention.

Figure 1:
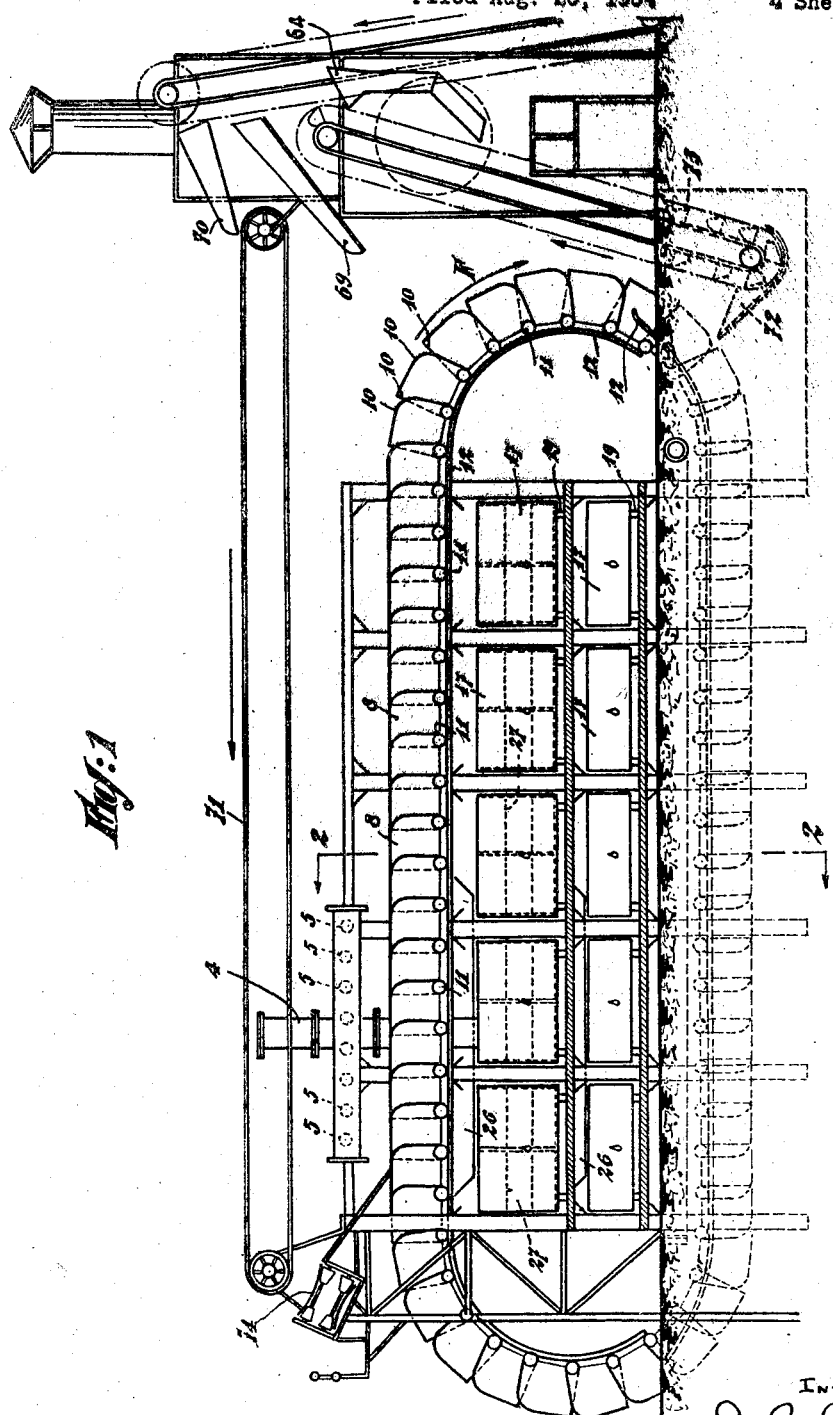
Fig. 1 is a general view of the plant according to the present invention for purifying water.

The two parts of the apparatus according to the present invention will be hereinafter described successively:

1. *Clarifying group*

This group, as shown by Figs. 1 and 2, consists of three superposed filtering stages of suitable thickness and composition.

The first stage 1 preferably consists of a bed of clinker. The second stage also consists of a bed of clinker, but its thickness is twice that of the first bed. Finally, the third bed 3, of a thickness substantially equal to that of the first bed, advantageously consists of a bed of flint suitably crushed and especially intended to eliminate colloidal matters.

Water to be purified is brought through conduit 4 to a series of distributing elements 5, each of these elements comprising a series of tubes 6 each provided at its end with a small turbine or the equivalent 7, the detailed structure of which will be fully described hereinafter with reference to Figs. 3 and 4, and which is intended to spray the water to be distributed in the form of a circular sheet.

These distributing elements extend across the whole width of the filtering bed 1 and they are disposed as shown by Fig. 1 in such manner as to distribute water over about one third of the length of the filtering bed.

The filtering layer of the first bed is disposed in a series of supports or elements 8 consisting each of a perforated bottom 9 (or a grid) extending over the whole width of the filtering bed and completed by two cheeks or side plates 10 made of sheet metal of suitable shape so that the side plates of one element 8 over lap the side plates of the adjacent element, as shown by Fig. 1.

Each of these elements 8 is provided with rollers 11 adapted to run along a track 12 and the whole of the elements and of this track is arranged to form an endless-chain conveyor which can be given a continuous translatory motion in the direction of arrow F (Fig. 1). According to a preferred embodiment, this motion is obtained through a series of driving shafts 13 simultaneously driven for instance by means of a chain acting on toothed wheels such as 14.

These shafts 13, which are suitably distributed over the path of travel of the endless chain formed by elements 8 are provided with two rollers 15 the periphery of which is milled or otherwise provided with projections and constantly applied against a rail 16 fixed to the bottom of each element 8. These elements 8 are driven by friction, the rollers being for instance made of bronze and the parts that form rail 16 being then made of fiber or any other similar material.

In order to ensure a constant friction, each of these shafts 13 is supported in a sliding journal provided with springs tending constantly to apply the driving rollers against rails 16.

Filtering stages 2 and 3, which are similar to each other, with the exception of the nature of the filtering matter, are arranged in a different manner.

Each of the beds or stages 2 and 3 is constituted by a series of tanks 17 the bottom 18 of which is provided with a grid. These tanks are provided with rollers 19 adapted to run along rails 20 so as to permit the transverse displacement of the tanks so as to bring them on platforms 21, 22. These displacements in the direction of arrow $F^1$ or in the opposite direction can be performed by means of capstans 23 (Fig. 2).

The last filtering stage or bed 3 is disposed above a kind of basin 24 intended to collect the water that has passed successively through the three filtering beds 1, 2 and 3, and to convey this water to the exhaust conduits 25.

Between two successive filtering beds, and at least between the first bed 1 and the second bed 2, it may be advantageous to dispose, at the place where the water to be clarified is distributed, shallow tanks 26 the bottoms of which are provided with holes (Figs. 1 and 2), in order to suitably distribute amongst several adjacent tanks 17 the water that is dripping from the first filtering bed 1.

Each of these tanks 17 may contain compartments 27, of a length equal to the width of the filtering beds and disposed as shown in dotted lines in Fig. 1. A travelling crane 28 is provided above platforms 21, 22 and its function with respect to the utilization of compartments 27 will be hereinafter fully explained.

It has been above stated that the water to be clarified was distributed through a series of tubes 6 provided with small turbines 7 which serve to atomize water. Figs. 3 and 4 show an embodiment of these turbines.

The water to be distributed is conveyed through the distributing element which carries a certain number of these nozzles. Each nozzle is provided with a groove 29 in which is fixed, through a bayonet joint 30, a tubular piece 31 surrounded by a sleeve 32 provided with apertures 33 and provided, in its intermediate part, with a collar 34 forming a groove 35 in which is housed a ball thrust bearing 36 carried by the hub 37 of the three blade propeller 38 which constitutes the turbine.

At the lower part of the turbine, a second thrust bearing 39 completes the structure and ensures a perfect positioning of the turbine with respect to its support, on which it is maintained by a nut 40 and its check-nut $40^a$ which is provided with a square-shaped hole $40^b$ permitting the driving thereof.

The propeller consists, as shown by Fig. 3 and 4 of three blades 38 disposed on a circular prolonged portion 41 of the hub, with which they are preferably integral. This part 41 is of conical shape and is provided with holes 42. The blades, which are provided, along their upper edge, with curved portions 43, further carry small ribs 44 arranged to be struck by water distributed through apertures 45 provided in sleeve 32, thus automatically producing the rotary motion of the turbine. Water is thus suitably atomized, on the one hand owing to its having passed through holes 42 and, on the other hand owing to the rotation of the turbine which projects said water in the form of a circular sheet onto the first filtering bed 1.

Openings 33 permit the inflow of air which is sucked in by the flow of water through tubular element 31. This air mixes with water and the mixture facilitates the oxidation of the matters contained in water. This oxidation is further improved by the atomization of water by the turbine.

In the case where the water that is treated has undergone no preliminary treatment, it is advantageous to make use of a mechanically operated grid, of a known type, which will be interposed between the water inlet and the water distributing devices. This grid, which will be horizontally disposed, will free the water that is to be treated from all light or compact solid deposits. These deposits, which are stopped by the bars of the grid, will be mechanically removed by means of movable rakes.

This arrangement, which is not shown in the drawings, is known in itself and constitutes an accessory device the use of which is not necessary according to the present invention.

2. Drying group

The drying device essentially comprises a hollow cylinder consisting of an envelope 50, made of a screen or of perforated metal, supported by frame elements 51.

At both of its ends, this cylinder is provided with envelopes made of sheet metal, as shown at 52 and 53. This cylinder, which is inclined on the horizontal direction, is completed by helical ribs provided on the one hand on the outside of the perforated envelope, as shown at 54, and on the other hand on the inside of this envelope as shown at 55. These helical ribs are wound in the same direction. This cylinder is mounted in a structure of masonry constituting a furnace at 56 with an ash-pit at 57, and a series of flues such as 58 directing the flow of the hot gases in such a manner as to improve their drying action. At the end of the cylinder is the base 59 of a chamber 60 arranged to stir the gases. The gases are expelled from this chamber through forced draught and escape through chimney 61. A partition 62 disposed parallelly to the cylinder leads the gases toward the end of the cylinder through which they enter it, these gases following the path indicated by arrows 63 and flowing out through flue 58.

The matters to be dried are are fed through a conduit 64 and penetrate into cylinder 50. Due to the rotation of this cylinder, ribs 55 progressively bring the matter toward the end 53, where they are evacuated through conduit 65. In the course of their passage through the cylinder, the matters are suitably dried by the hot gases flowing through said cylinder. In the course of this drying, it may happen that some matter, such in particular as mud, pass through the perforated envelope of the cylinder and fall onto partition 62. These matters are then conveyed toward the furnace through the action of the outer helical rib 54. They constitute a supplement of fuel, of relatively little value, it is true but nevertheless interesting (from 1,200 to 1,800 calories). The end parts of the cylinder, which, as above explained, are made of sheet metal, serve to ensure fluidtightness and the gases are thus suitably kept in the active part of the drier.

The masonry envelope of the dryer will advantageously consist of double or triple envelopes with a circulation of the hot gases therein after passage of said gases at 58, so as to ensure the heating of the inner walls and thus to avoid the loss of calories that generally results from absorption by radiation. When issuing from the drying cylinder, the materials are poured into hole 66, where they are caught by conveyor 67 which brings them to a sorting drum 68 provided with two outlet orifices 69 and 70.

This sorting drum 68 has its envelope made of a screen so devised that all the matters of a given size pass therethrough and are led to outlet 69 through which they are evacuated. On the contrary, the matters that have not passed through the screen are brought to outlet 70, disposed above conveyor 71, which brings these matters to the place where they are again utilized.

The working of the whole clarifying and drying device takes place in the following manner, which will be described chiefly with reference to Fig. 1 of the drawings.

Water to be clarified is brought through a conduit 4 and is distributed onto the first filtering bed which moves with a very slow continuous movement in the direction of arrow F. (By way of example, the velocity of this filtering bed may vary between 0.5 and 2 metres per hour.) While flowing through the first filtering bed, the water to be clarified deposits in this bed a certain amount of matters which clog the clinker of which this first bed is made. This clinker is poured into a hole 72, from where it is taken and conveyed by a conveyor 73 to conduit 64, through which it is fed to the drying cylinder. In this cylinder, the matters are treated as above explained, after which they are conveyed to sorting drum 68. The matters that comply with the requirements of size are poured through outlet 70 onto conveyor 71, which leads them to a second conveyor 74 which suitably distributes them over the whole width of the first filtering bed 1 before this portion of the filtering bed has been brought under the water distribution system. The matters that have passed through the walls of sorting drum 68, such as manure that has been dried, are evacuated through outlet 69.

After passing through the first filtering bed, water passes through the second filtering bed, the filtering matter of which is therefore more or less clogged. The tanks that contain these filtering matters can be examined by withdrawing them from the apparatus by means of capstans 23.

The elements that have been found to be polluted are removed and replaced by fresh elements. Their handling will be facilitated by the provision of crane 28 which serves to convey the polluted elements above hole 72 into which they are emptied, the materials being then conveyed to the drier with a view to regenerating them.

A platform 75 (Fig. 2) is provided opposite conveyor 74 and the elements of the tanks 17 of the second filtering bed will be filled with fresh or regenerated material on this platform.

It results from the foregoing description that the same filtering matters can be used for an indefinite period of time after being successively dried and regenerated.

While I have described what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus for clarifying water which comprises, in combination, at least two filtering beds disposed above one another so that water is caused to flow successively therethrough, means for continuously moving the upper bed with a translatory motion with respect to the second bed, an inclined perforated hollow cylinder adapted to rotate in a continuous manner, means for feeding the matter of the upper filtering bed into said cylinder after its passage over the second filtering bed, a furnace, means for causing gases from said furnace to flow through said cylinder, a perforated sorting drum connected with the outlet end of said cylinder and adapted to eliminate the matters that pass through the perforations thereof, and a conveyor connected with the outlet of said drum for carrying the matters that have not passed through the perforations of said drum to the end of said first mentioned bed.

2. An apparatus for clarifying water which comprises, in combination, at least two filtering beds disposed above one another so that water is caused to flow successively therethrough, means for continuously moving the upper bed with a translatory motion with respect to the second bed, an inclined perforated hollow cylinder adapted to rotate in a continuous manner, means for feeding the matter of the upper filtering bed into said cylinder after its passage over the second filtering bed, a furnace, means for causing gases from said furnace to flow through said cylinder, sorting means, connected with the outlet end of said cylinder, for separating the matter issuing from said end of the cylinder into elements below a certain size and elements above a certain size, means for evacuating the first mentioned elements and means for feeding the second mentioned elements back to the first mentioned filtering bed.

3. An apparatus for clarifying water which comprises, in combination, at least two filtering beds disposed one above the other so that water is caused to flow successively therethrough, means for continuously moving the upper bed with a translatory motion with respect to the second bed, an inclined perforated hollow cylinder adapted to rotate in a continuous manner, means for feeding the matter of the upper filtering bed into said cylinder after its passage over the second filtering bed, a furnace, means for causing gases from said furnace to flow through said cylinder, a perforated inclined sorting drum connected at its upper end with the outlet end of said cylinder, a hopper located under said drum so as to eliminate the matters that pass through the perforations of said drum, and a conveyor connected with the lower end of said drum for carrying the matters fed by said drum to the end of said first mentioned filtering bed.

4. An apparatus for clarifying water, which comprises, in combination, at least two beds of filtering matters disposed one above the other so that water is caused to flow successively therethrough, an endless conveyor with perforated bottom supporting the upper bed, means for continuously moving said conveyor so that a portion thereof moves with a translatory motion above the second bed, an inclined perforated hollow cylinder adapted to rotate in a continuous manner, means for feeding the filtering matter from said conveyor into said cylinder after its passage over the second filtering bed, a furnace, means for causing gases from said furnace to flow through said cylinder, a perforated inclined sorting drum connected at its upper end with the outlet end of said cylinder, a hopper located under said drum adapted to eliminate the matters that pass through the perforations of said drum, and a conveyor connected with the lower end of said drum for carrying the matters fed by said drum to the first mentioned conveyor at the part thereof where it begins to move above the second mentioned bed.

PIERRE RENÉ GIRAUD.